J. A. ROUSSOTTE, DIT ROUSSOLTE.
AEROPLANE WHEEL.
APPLICATION FILED JAN. 23, 1918.
1,316,333.
Patented Sept. 16, 1919.
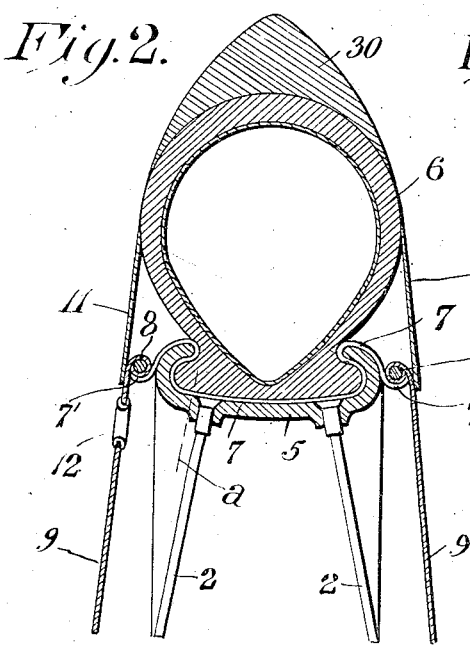
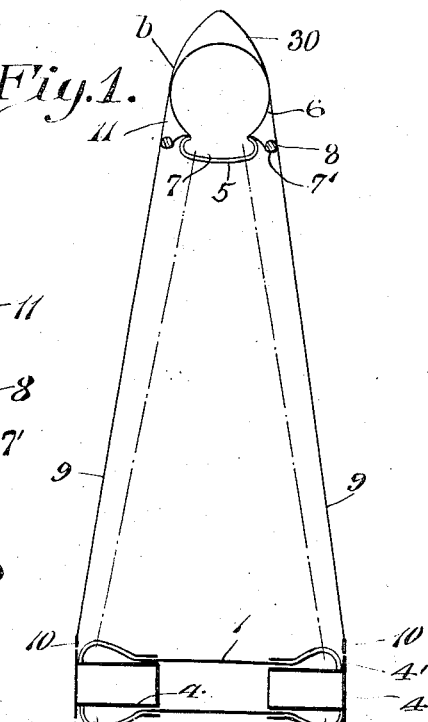
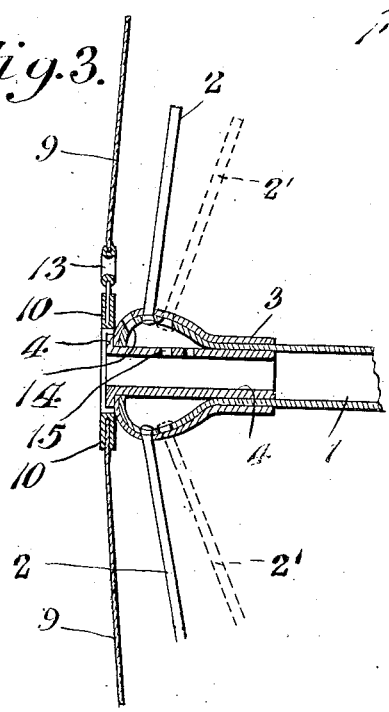
Inventor
Jules Alban Roussotte
called Roussotte
By [signature]
Attorney.

UNITED STATES PATENT OFFICE.

JULES ALBAN ROUSSOTTE, DIT ROUSSOLTE, OF PARIS, FRANCE.

AEROPLANE-WHEEL.

1,316,333.  Specification of Letters Patent.  Patented Sept. 16, 1919.

Application filed January 23, 1918. Serial No. 213,437.

*To all whom it may concern:*

Be it known that I, JULES ALBAN ROUSSOTTE, called ROUSSOLTE, citizen of the Republic of France, and resident of Paris, France, (post-office address 4 Rue de Mondovi,) have invented a new and useful Improved Aeroplane-Wheel, which is fully set forth in the following specification.

This invention has for its object to provide an improved aeroplane wheel covered in at its sides by side covers that leave no gap between the pneumatic tire and the hub of the wheel.

This improved construction is designed to suppress completely the air eddies produced during the travel of an aeroplane when the hitherto usual covering for the wheels is employed, because such air eddies cause a rather considerable diminution in the progress of the machine provided with wheels covered in the said usual manner. The improved wheel has further the advantage of being very light owing to the arrangement of bulging hub employed in this construction.

The accompanying drawings illustrate by way of example a constructional form of a wheel according to this invention. In these drawings:

Figure 1 is a cross sectional elevation of the general arrangement of an aeroplane wheel provided with the improved covering means.

Fig. 2 is a cross section of that part of the improved covering which is in contact with the tire.

Fig. 3 is a cross section of that part of the improved cover which is in contact with the hub, and of the said hub itself.

The hub of the wheel consists of a tube 1 that is bulged out at each end (Fig. 3). The bulged shape shown at 1' is designed to facilitate the mounting of the wheel spokes 2 and to enable the said spokes to be staggered as indicated in dot and dash lines at 2' so as not to weaken the metal. In order to increase the strength of the bulged out part 1' of the hub, the said part is covered, before being bulged out, with a sleeve 3 that is consequently bulged out at the same time as the hub. This reinforcement of the hub may also be performed after the bulging out of the tube 1. Inside the hub 1 there is arranged a sleeve 4 designed to serve as a race for the journal of the wheel axle. This sleeve is made very light and projects at 4' slightly beyond the end of the hub.

The spokes 2 which are fixed to the hub on its bulged out part 1', are fixed at their other ends to the wheel rim 5 (Fig. 2) in the ordinary manner. The wheel rim 5 is fitted with a pneumatic tire 6 of any suitable type, and is provided around its periphery with a suitable number of parts 7 which are fitted exactly to the internal shape of the wheel rim and terminate at each end in a portion 7' in the form of a hook. The part 7 might also have only a single hook 7' and would in such a case stop short at or near the line *a* (Fig. 2). It is obvious that these hooks might also be fixed in any suitable manner on the wheel rim 5. The hooks 7' each are intended to receive a metal ring 8 to which is fixed the outer edge of the corresponding side cover 9. At its center the said side cover carries an annular metal disk 10 in which it is fixed and which fits exactly over the part 4' of the sleeve 4. As will be readily understood, the side cover 9 will always remain rigid and will always be completely independent of the pneumatic tire 6. In order to provide a connection between the pneumatic tire and the side cover 9 for the sole purpose of dispensing completely with any part that might cause air eddies, a circular band 11 of flexible material is fixed in any suitable manner to both the pneumatic tire and the side cover. It will therefore be understood that at every compression of the pneumatic tire 6, the result will be to slacken the circular band 11 which therefore will alone be subjected to deformation. 12 is an aperture provided in the side cover 9 opposite the valve for the pneumatic tire. When it is desired to take the device to pieces, this aperture 12 will allow the operator to act with one finger upon one of the hooks 7' for the purpose of facilitating such taking apart.

As will be readily understood from an examination of Fig. 1, the circular parts 9 and 11 situated to the right and left of the wheel, constitute a rigid whole which will undergo no deformation from the point *b* situated on the pneumatic tire to the annular disk 10 that surrounds the hub of the wheel.

Owing to the simplicity of the parts employed the side covers 9 can be mounted and dismounted conveniently and quickly.

The lubrication of the wheel axle is effected by forming in the side covers 9 apertures 13 through which there can be inserted the spout of an oil-can which will allow the oil to reach the axle of the wheel through holes 14 and 15 formed respectively in the hub parts 3 and 1' and in the sleeve 4.

As shown in Figs. 1 and 2, the tire may be provided around its periphery with a tread band 30 of plastic material having a tapering or conical shape for reducing the resistance of the tire to the wind.

Having now particularly described and ascertained the nature of my said invention and in what manner the same is to be performed, I declare that what I claim is:—

1. In an aeroplane wheel comprising a rim, a hub provided with a bearing sleeve having a collar and spokes connecting said hub and rim, a side cover arranged on each side of the wheel, designed to do away with the air eddies generated by the travel of the aeroplane, said side cover being composed of concentric outer and inner circular parts, of which the inner part does not undergo any deformation and is mounted by means of a ring on hooks provided on the wheel rim, said hooks fitting accurately the shape of the inner part of the said rim; the central portion of the said inner cover part being provided with an annular disk in which it is fixed and which surrounds the said collar of the bearing sleeve of the wheel hub; the outer part of the side cover consisting of a simple flexible circular band fixed at one edge to the pneumatic tire and at its other edge to the periphery of the said inner circular part, whereby the parts can be mounted and dismounted conveniently and very quickly.

2. In an aeroplane wheel, the combination of a rim, a hub provided with a bearing sleeve having a collar, spokes connecting said hub and rim, hooks mounted on said rim and conforming accurately to the shape of the inner part thereof, a ring mounted on said hooks on each side of the wheel, and a circular cover on each side of the wheel for suppressing the air eddies generated by the travel of the aeroplane, each cover having its outer edge connected with the adjacent ring and having its central portion provided with an annular disk in which it is fixed and which surrounds the collar on said bearing sleeve; substantially as described.

In testimony whereof I have signed this specification in the presence of two subscribing witnesses.

JULES ALBAN ROUSSOTTE DIT ROUSSOLTE.

Witnesses:
GEORGES LOISEL,
JOHN F. SIMONS.